US011968002B2

United States Patent
Barois et al.

(10) Patent No.: US 11,968,002 B2
(45) Date of Patent: Apr. 23, 2024

(54) RECEPTION METHOD AND RECEPTION CHAIN FOR A PLC MODEM

(71) Applicant: SAGEMCOM ENERGY & TELECOM SAS, Malmaison (FR)

(72) Inventors: Jérôme Barois, Malmaison (FR); Guillaume Bacri, Malmaison (FR); Julien Barthes, Malmaison (FR); Clément Terrien, Malmaison (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 61 days.

(21) Appl. No.: 17/362,258

(22) Filed: Jun. 29, 2021

(65) Prior Publication Data
US 2022/0006489 A1    Jan. 6, 2022

(30) Foreign Application Priority Data
Jul. 1, 2020   (FR) ...................................... 2006949

(51) Int. Cl.
*H04B 3/54*    (2006.01)
*H04B 3/21*    (2006.01)
*H04L 27/00*   (2006.01)

(52) U.S. Cl.
CPC ............... *H04B 3/542* (2013.01); *H04B 3/21* (2013.01); *H04L 27/0002* (2013.01)

(58) Field of Classification Search
CPC .... H04B 2203/5433; H04B 3/21; H04B 3/54; H04B 3/542; H04L 27/0002
See application file for complete search history.

(56) References Cited

U.S. PATENT DOCUMENTS

2012/0134395 A1    5/2012  Varadarajan et al.
2015/0319272 A1*  11/2015  Varadarajan .......... H04L 69/323
                                                          370/392

FOREIGN PATENT DOCUMENTS

EP          3104569 A1    12/2016

OTHER PUBLICATIONS

Feb. 22, 2021 Search Report issued in French Patent Application No. 2006949.

* cited by examiner

*Primary Examiner* — Nader Bolourchi
(74) *Attorney, Agent, or Firm* — Williams Mullen; R. Brian Drozd

(57) ABSTRACT

A transmission method in a first node device of a power line communication network, the first node device being configured so as to apply a reception mode for receiving data transmitted by a second node device in one or more separate frequency bands in parallel or else in a frequency band called "extended frequency band" comprising at least two separate frequency bands, the method comprising steps of de-interleaving the data read from a buffer memory in a first de-interleaving mode specific to reception in an extended frequency band and detecting whether the de-interleaved data are coherent and, if the obtained data are coherent, recording the de-interleaved data and, if not, de-interleaving data, for each of the separate frequency bands, in a de-interleaving mode specific to the separate frequency band for which the de-interleaving is performed and, if the de-interleaved data are coherent, recording the de-interleaved data.

10 Claims, 8 Drawing Sheets

Fig. 7

RECEPTION METHOD AND RECEPTION CHAIN FOR A PLC MODEM

TECHNICAL FIELD

At least one embodiment of the present invention relates to a node device belonging to a network using power line communications. At least one embodiment of the present invention relates to a reception chain in such a node device, and to a reception method for this node device.

PRIOR ART

Power line communications (PLC) are becoming more widespread, in particular in the context of AMM (abbreviation for "Automated Meter Management") electricity supply networks. Communication networks are thus implemented in electricity supply networks in order for a base node device (also called "data hub") of the network to automatically collect, from smart electricity meters, energy consumption reading data that said smart electricity meters are respectively responsible for monitoring.

The G3-PLC communication standard is defined so as to allow the various node devices (in particular data hub and smart electricity meters) of such a network to communicate with one another. The standard is specified in the ITU-T G.9903 recommendation, which describes in particular the physical layer (PHY) and the data link layer (DLL) of the OSI (acronym for "Open Systems Interconnection") model. The G3-PLC standard is intended to be used in frequency bands ranging from 10 to 490 kHz. More specifically, it supports the following frequency bands: the CENELEC A frequency band, which ranges approximately from 35 kHz to 91 kHz: the FCC frequency band, which ranges approximately from 150 kHz to 480 kHz; the ARM frequency band, which ranges approximately from 150 kHz to 400 kHz; and the CENELEC B frequency band, which ranges approximately from 98 kHz to 122 kHz. These various frequency bands have different characteristics in terms of data rate, range, and resistance to interfering factors in particular.

However, the G3-PLC standard permits the use of only one of said frequency bands for a given node device. More precisely, modern node devices may sometimes support a plurality of frequency bands, but not at the same time. A reconfiguration is then required in order to change from a first frequency band to a second frequency band. Thus, when, in a communication network, it is necessary to reconfigure a set of data hub devices and a set of electricity meters associated therewith in a new frequency band, a reconfiguration may prove to be particularly complex. For example, a meter device that has not been able to receive a message telling it to change frequency band may become incapable of communicating with the data hub device with which it is associated after the latter has for its part been able to change frequency band.

However, the needs in terms of resources of communication networks, in particular in the deployment of AMM electricity supply networks, are increasing on a daily basis. The frequency band for which the elements forming a network have been certified may be at a capacity limit, thereby forming an obstacle to increasing the number of exchanges in the network, for example in order to introduce new functionalities or even new application needs, for example.

It is desirable to overcome these various drawbacks from the prior art. It is thus desirable in particular to propose a power line communication-based solution that makes it possible to increase the capacity for the number of exchanges in the communication network. It is in particular desirable to propose a solution that is applicable to AMM electricity supply networks.

SUMMARY OF THE INVENTION

To this end, one subject of the invention is a transmission method in a first node device of a power line communication (PLC) network, the first node device being configured so as to apply a reception mode for receiving data transmitted by a second node device in one or more separate frequency bands in parallel, or else in a frequency band called "extended frequency band" comprising at least two separate frequency bands, the method being such that reception in the extended frequency band takes place in parallel in the at least two separate frequency bands, and in that it comprises steps of:
  converting the data received in the form of an analogue signal in one or more of said separate frequency bands into a first series of data,
  filtering said first series of data in parallel through the same number of filtering circuits as there are frequency bands for which the first node device is configured in reception mode, so as to obtain the same number of second series of data as there are frequency bands for which the first node device is configured in reception mode,
  demodulating said second series of data through the same number of demodulation circuits as there are frequency bands for which the first node device is configured in reception mode, so as to obtain third series of data,
  recording the third series of data in a first buffer memory, and
  de-interleaving the data, for each of the separate frequency bands, in a de-interleaving mode specific to the separate frequency band for which the de-interleaving is performed, detecting whether the de-interleaved data are coherent and, if the de-interleaved data are coherent, supplying the de-interleaved data with a view to subsequent processing.

The term "separate frequency band" in this case denotes a frequency band separate from another frequency band.

A first advantage of the described method is that it is possible to receive data transmitted in an extended frequency band or else on one or more separate frequency bands while modifying the architecture of a node device of a power line communication network only to a limited extent.

It is thus possible, based on limited modifications to the physical layer of an existing node device, to use a plurality of frequency bands in parallel while still addressing hardware means that are used in parallel (modulators at transmission and demodulators at reception) while referring to an extended frequency band, in a manner similar to what is performed for communications in a single frequency band.

The advantages stemming from simultaneous use of a plurality of frequency bands are for example increasing the average speed of transmissions between two neighbouring nodes, and therefore more broadly through the communication network, optimized distribution of the load of the network over a plurality of frequency bands, and better communication in an environment subjected to interference.

The advantages stemming from addressing a single frequency band, that is to say the extended band that comprises a plurality of separate frequency bands, lie in simplifying the management of interference. It is thus possible to overcome any temporal interference (starting up of an apparatus, for example) or frequency interference (presence of electromagnetic interference only at some frequencies).

The method according to the invention may also comprise the following features, considered on their own or in combination:

The first node device is furthermore configured so as to apply a reception mode for receiving data transmitted by a second node device in a frequency band called "extended frequency band" comprising at least two separate frequency bands, reception in the extended frequency band taking place in parallel in the at least two separate frequency bands, the method furthermore comprises steps of de-interleaving the data read from the first buffer memory in a de-interleaving mode specific to reception in an extended frequency band, detecting whether the de-interleaved data are coherent and, if the data de-interleaved in a de-interleaving mode specific to the extended frequency band are coherent, supplying the de-interleaved data with a view to subsequent processing.

The step of detecting whether the data are coherent comprises checking control bits by way of a direct error correction circuit called "FEC".

The step of detecting whether the data are coherent comprises reading a data frame control header and determining a checksum of CRC type.

The subsequent processing is a read operation on a MAC layer data frame formatted in accordance with the ITU-T G9903 recommendation, and the second buffer memory is a reception memory of the MAC sublayer of the link layer of the OSI network model.

The filtering circuits preferably comprise second-order filters that separate data respectively transmitted in separate frequency bands from among the following group: CENELEC A frequency band, CENELEC B frequency band, and FCC frequency band or ARIB frequency band.

Another aim of the invention is to propose a node device called "first node device" in a power line communication network, the first node device being configured so as to communicate in one or more separate frequency bands with a second node device of said network, the first node device being characterized in that it is furthermore configured so as to apply a reception mode for receiving data in one or more of said separate frequency bands in parallel, and in that the first node device comprises electronic circuits configured so as to:
    convert the data received in the form of an analogue signal in one or more of the separate frequency bands into a first series of data,
    filter the first series of data in parallel through the same number of filtering circuits as there are frequency bands for which the first node device is configured in reception mode, so as to obtain the same number of second series of data as there are frequency bands for which the first node device is configured in reception mode,
    demodulate the second series of data through the same number of demodulation circuits as there are frequency bands for which the first node device is configured in reception mode, so as to obtain third series of data, record the third series of data in a first buffer memory, and
    de-interleave data, for each of the separate frequency bands, in a de-interleaving mode specific to the separate frequency band for which the de-interleaving is performed and, if the de-interleaved data are coherent, supply the de-interleaved data with a view to subsequent processing.

Advantageously, the node device is furthermore configured so as to apply a reception mode for receiving data transmitted by a second node device in a frequency band called "extended frequency band" comprising at least two separate frequency bands, reception in the extended frequency band taking place in parallel in the at least two separate frequency bands, and the node device furthermore comprises means for:
    de-interleaving the data read from the first buffer memory in a de-interleaving mode specific to reception in an extended frequency band and detecting whether the de-interleaved data are coherent and,
    if the data de-interleaved in a de-interleaving mode specific to the extended frequency band are coherent, supplying the de-interleaved data with a view to subsequent processing.

Another subject of the invention is a power line communication network comprising a plurality of node devices as mentioned above.

Another subject of the invention is a computer program product comprising program code instructions for executing the steps of the method described above when the program is executed by a processor, and also an information storage medium comprising such a computer program product.

BRIEF DESCRIPTION OF THE DRAWINGS

The abovementioned features of the invention, and others, will become more clearly apparent on reading the following description of at least one exemplary embodiment, said description being given with reference to the appended drawings, in which:

FIG. 7 illustrates a breakdown of the data interleaving table T, shown in FIG. 5 and FIG. 6, into second interleaving tables T1 and T2 for distributing interleaved data into a plurality of frequency bands;

DETAILED DESCRIPTION OF EMBODIMENTS

Figure 1:
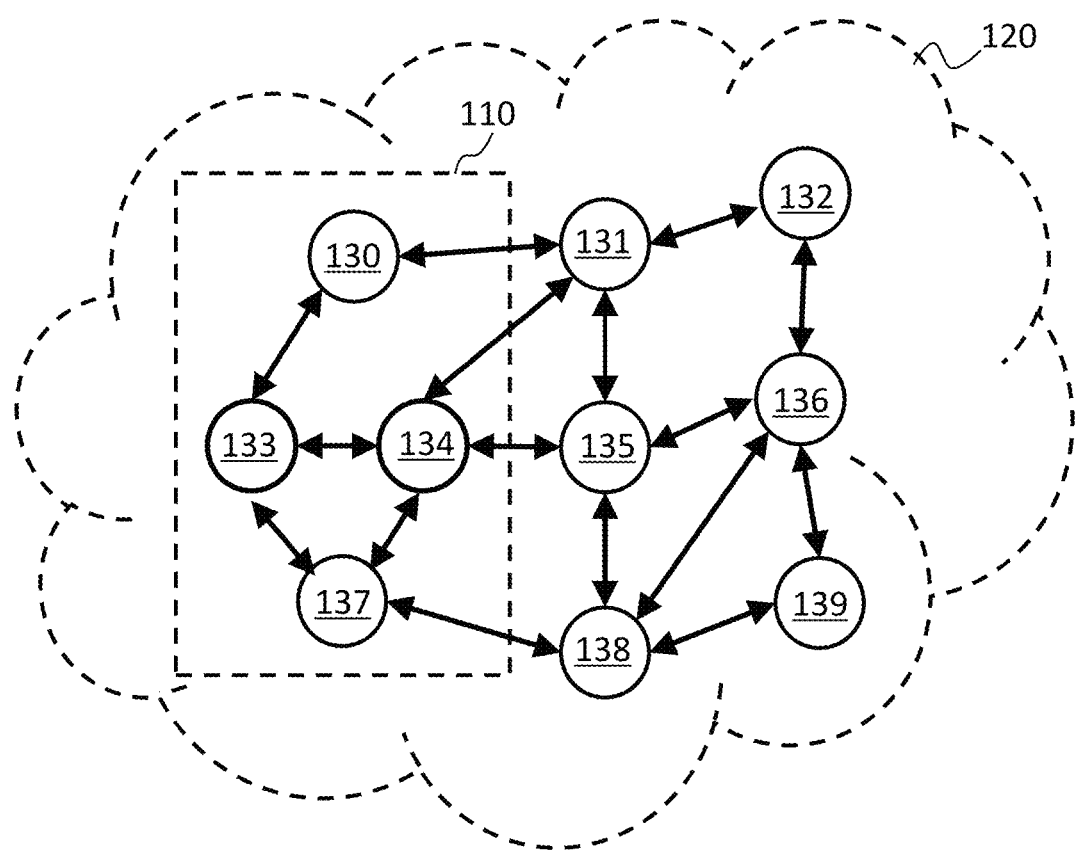
FIG. 1 illustrates an electricity supply network using power line communications.

FIG. 1 schematically illustrates a communication network 120. The communication network 120 is based on power line communications PLC. The communication network 120 is for example an AMM electricity supply network allowing a base node device (also called "data hub") to collect, from smart electricity meters, energy consumption reading data for electrical installations that said smart electricity meters are respectively responsible for monitoring. The data hub and the smart electricity meters are thus node devices of the communication network 120. The communication network 120 may comprise other node devices, for example installed in electrical transformers.

The communication network 120 has a meshed structure. The meshed structure of the communication network 120 is shown schematically in FIG. 1 through arrows representing the communication links between two neighbouring nodes, and in which some node devices act as a relay so as to increase the communication range in the communication network 120. One and the same smart electricity meter thus potentially has a plurality of routes for reaching the data hub, and vice versa.

The present invention is therefore particularly suited to the context of G3-PLC technology. The communication network 120 thus comprises a plurality of node devices 130, 131, 132, 133, 134, 135, 136, 137, 138, 139. A network neighbourhood is associated with each of the node devices of the communication network 120. For example, the node device 133 in FIG. 1 is associated with a network neighbourhood 110 incorporating the node devices 130, 134 and 137. In the communication network 120, a signal or a message broadcast by a node device, such as for example the node device 133, is not generally visible at any point of the communication network 120. Each node device transmitting signals or messages then has a network neighbourhood, that is to say a subset of the communication network 120, in which any node device is able to intelligibly receive the signals or messages directly from the node device that broadcast these signals or messages. The network neighbourhood corresponds to the range of the transmitted signals, depending on predetermined transmission parameters (for example power, modulation and coding scheme, network topology, etc.) of the node device at the source of the signals and also potentially depending on characteristics of the communication channel, such as for example an attenuation, a noise level or an impedance.

The communication network 120 is based on a reactive routing protocol, such as for example the LOADng ("Lightweight On-demand Ad hoc Distance-vector Routing Protocol-Next Generation protocol") protocol. In contrast to proactive routing protocols, which are based on overall network topology knowledge, reactive routing protocols are based on on-demand route discoveries, each node device of the network then needing only to know its own network neighbourhood in order to route data in the communication network 120.

To discover an appropriate route in the communication network 120 from a source node device (for example the node device 133) to a destination node device (for example the node device 132), it is known that the source node device broadcasts a route discovery request, called RREQ ("Route REQuest"). This route discovery request is received by each node device in the network neighbourhood of said source node device. Each node device in the network neighbourhood of said source node device relays said request through broadcasting if said node device in question is not the destination node device. Through step-by-step broadcasting, a plurality of copies of the route discovery request are typically received by the destination node device, each of these copies having taken a different path in the communication network 120.

The use of routing tables stored in the node devices makes it possible to perform point-to-point or unicast communications between any pair of node devices of the communication network 120. Intermediate node devices therefore serve as a relay when the node devices of said pair are not in the network neighbourhood of one another, and the communications thus take place step-by-step, each node device using one of its own neighbours to track messages to their respective intended recipients.

For communication between neighbouring node devices (that is to say node devices that are in the network neighbourhood of one another), the messages are transmitted in the form of modulated frames. When a modulated frame is addressed specifically to a neighbouring node device and it is demodulated correctly thereby, said neighbouring node device retransmits an acknowledgement ACK to the node device that addressed said modulated frame thereto. The acknowledgement ACK is transmitted on the same frequency band as the modulated frame with which said acknowledgement ACK is associated.

A plurality of frequency bands are defined in order to support the transmission of these modulated frames, an appropriate modulation scheme being associated with each of these frequency bands. Each frame transmitted in the form of modulated signals begins with a predefined preamble depending on the modulation scheme in accordance with which said signals were modulated. The preamble is designed to make it possible to perform synchronization at reception on said frame, that is to say to be able to determine an effective frame start time. To this end, the preamble typically comprises a plurality of successive copies of one and the same symbol. The effective content and the duration of the preamble are thus predefined and depend on the modulation scheme that is used. The preambles of a plurality of frames are identical when the same modulation scheme is applied, and differ if not.

The applicable modulation schemes (and corresponding demodulation schemes) are preferably OFDM ("Orthogonal Frequency Division Multiplex") multi-carrier modulation schemes (respectively demodulation schemes).

In terms of frequency bands able to be used in the context of implementing the communication network 120, mention may be made of the following: the CENELEC A frequency band, which ranges approximately from 35 kHz to 91 kHz: the FCC frequency band, which ranges approximately from 150 kHz to 480 kHz; the ARIB frequency band, which ranges approximately from 150 kHz to 400 kHz; and the CENELEC B frequency band, which ranges approximately from 98 kHz to 122 kHz. It is then possible to use: a first modulation scheme with thirty-six carriers in the CENELEC A frequency band; a second modulation scheme with seventy-two carriers in the FCC frequency band; a third modulation scheme with fifty-four carriers in the ARIB frequency band; and a fourth modulation scheme with sixteen carriers in the CENELEC B frequency band. It is apparent from the above that a node device may simultaneously use a plurality of separate frequency bands to communicate with one or more of its neighbours by applying an appropriate transmission mechanism. However, it appears that the ARIB and FCC frequency bands cannot be used simultaneously by one and the same node device, given that they overlap.

Advantageously, at least some of the node devices 130, 131, 132, 133, 134, 135, 136, 137, 138, 139 are configured so as to communicate in a plurality of separate frequency bands. It is therefore important, for a given node device, to be able to determine which communication modes are supported by a node device in its network neighbourhood. The term "supported communication modes" denotes one or more native communication modes of a node device, that is to say that said node device is capable of implementing due to its possible configurations, and also means that these one or more native communication modes are able to be used at a given time, given the possible interference that may exist. The interference may originate for example from a noisy environment.

A message exchange in accordance with a predefined protocol for example allows a first node device to obtain information with regard to the communication capabilities of a neighbouring second node device. For example, the first node device addresses to the neighbouring second node device a copy of a first message in each of the frequency bands in which it is able to communicate due to its configuration, and the neighbouring node device is configured so as to recognize such a message and to respond thereto through a second message in each of the frequency bands in which it was able to receive it.

In a G3-PLC context, for example, the copies of the first message contain information according to which a channel estimate is requested from the neighbouring node device, for the frequency band in which it received the message (called "Tone Map" request). Advantageously, the information according to which a channel estimate is requested from the neighbouring second node device by the first node device is then a Tone Map Request indicator of a frame control header defined in accordance with the ITU-T G9903 recommendation. The neighbouring second node device will thus respond to the Tone Map Request request by sending, to the first node device, in each of the frequency bands in which it received a copy of the first message, a second message comprising information representative of at least one channel estimate in the form of a Tone Map Request data block as defined in accordance with the ITU-T G9903 recommendation.

The first device may therefore ascertain and store information with regard to the frequency bands that it is able to use to communicate with the neighbouring second node device.

According to one embodiment of the invention, at least some of the node devices 130, 131, 132, 133, 134, 135, 136, 137, 138, 139 supporting communication modes for communicating in a plurality of separate frequency bands also support a communication mode for communicating in a frequency band called "extended frequency band". An extended frequency band advantageously comprises a plurality of separate frequency bands. An extended frequency band may thus comprise two, three or four separate frequency bands, for example, or even more. Each separate frequency band uses a plurality of subcarriers.

Determining the capability of a neighbouring node device to communicate in an extended frequency band is similar to what is described above for determining the various communication modes supported by a device, considering that the extended frequency band is commonly defined between the various neighbouring node devices of the communication network. Thus, according to one embodiment, the extended frequency band may be defined as comprising the CENELEC A frequency band, the CENELEC B frequency band and the FCC band. According to one variant, the extended frequency band may be defined as comprising the CENELEC A frequency band, the CENELEC B frequency band and the ARIB band. These examples are not limiting. A first node device may therefore transmit a channel estimate request (called "TONE MAP" request) in the extended frequency band in order to determine whether a neighbouring second node device supports communications in the extended frequency band. For this purpose, an information field in a message that contains a channel estimate request in the extended band furthermore comprises an indicator according to which the request is transmitted in the extended band.

Advantageously, when a node device, such as for example the node device 133 of the communication network 120, transmits data to a neighbouring node device, such as the node device 134 for example, by applying a communication mode for communicating in an extended frequency band, distribution of the data over the set of frequency bands cleverly carried out by the interleaver makes it possible to minimize the adjustments required to the conventional architecture of a node device according to the prior art.

According to one embodiment, the data to be transmitted in an extended frequency band are interleaved in an interleaving mode specific to the communication mode for communicating in an extended frequency band, based on serial flow of data available at the output of a Viterbi encoder, and before transmission of groups of data to each of the modulators that are used, which are respectively associated with each of the at least two separate frequency bands that jointly form the extended frequency band.

The data transmitted in an extended frequency band are thus distributed over the set of subcarriers of the separate frequency bands of the extended frequency band, and a node device has to be able to distinguish, at reception, whether the received data were transmitted on just one of the separate frequency bands (single-band), on a plurality of separate frequency bands not referring to the extended frequency band (multi-band), or else on the extended frequency band comprising at least two separate frequency bands perceived jointly as forming a single band.

Advantageously, the de-interleaving performed at reception, in a manner symmetrical to the interleaving performed at transmission, makes it possible to identify the transmission mode of the data, specifically without requiring any significant modifications to the conventional architecture of a node device designed for power line communications and having to reconstruct the data frames with a view to subsequent processing by the MAC layer.

Figure 2:
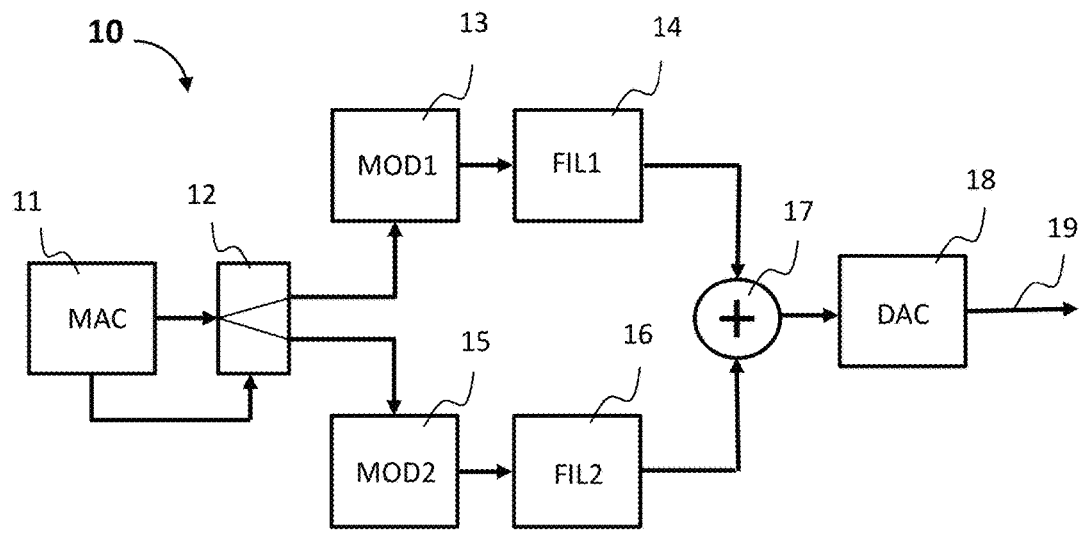
FIG. 2 illustrates a digital processing component in a node device of the network already shown in FIG. 1, according to one embodiment.

FIG. 2 illustrates a digital processing circuit 10 of a transmission stage of a node device of the communication network 120, such as for example the node device 133. A module MAC 11 groups together all of the processing circuits that implement the MAC link sublayer of the OSI model. In the example that is shown, the circuit 10 comprises two modulators MOD1 13 and MOD2 15 respectively associated with two separate frequency bands. Data originating from the module MAC 11 may thus be directed to one or the other of the processing chains corresponding, respectively, to the modulator MOD1 13 or to the modulator MOD2 15, or else to these two processing chains in parallel. Directing the data to just one of the modulators MOD1 13 and MOD2 15 corresponds to a single-band communication mode. Directing the data originating from the module MAC 11 to the two modulators in parallel corresponds to a multi-band communication mode or to a communication mode in an extended frequency band. The data originating from the module MAC 11, that is to say originating from the MAC link sublayer of the OSI model, are cleverly directed by a data switching module 12. The data switching module comprises a data interleaving circuit that operates differently depending on the communication mode applied by the node device that comprises the digital processing circuit 10. Digital filters FIL1 14 and FIL2 16 respectively filter the data at the output of the modulators MOD1 13 and MOD 2 15, which are then grouped together by an adder circuit 17 and applied to a digital-to-analogue converter DAC 18. According to one embodiment, the analogue signal delivered at the output 19 of the digital-to-analogue converter DAC 18 is then amplified by an operational amplifier and then applied to a frequency-controllable analogue filter. The frequency-controllable analogue filter operates under the control of the module MAC 11. Finally, the signal filtered by the analogue filter is applied to an output stage, which injects the PLC signal thus created, based in particular on data from the MAC layer, into the mains. The operational amplifier, the analogue filter and the output stage are not shown in FIG. 2. According to one embodiment, the processing chain described at transmission comprises a conventional architecture except for with regard to the interleaving circuit. The transmission chain thus comprises a direct error correction encoder called "FEC" encoder or else "FEC", and furthermore comprises, for each of the processing chains corresponding, respectively, to the modulator MOD1 13 and to the modulator MOD2 15, a circuit performing an inverse Fourier transform. The FEC encoder comprises a scrambling circuit, a Reed-Solomon encoder, a Viterbi encoder, a duplication circuit for implementing what are called robust communication modes, and an interleaving circuit. The interleaving circuit forms the last stage of the FEC encoder and also forms the data switching module 12 shown in FIG. 2.

According to one embodiment of the invention, the interleaving circuit of the FEC encoder, or data switching circuit 12, operates differently depending on the communication mode applied by the node device.

Cleverly, for a communication mode for communicating in an extended frequency band, the data are interleaved on a first interleaving table T that comprises concatenated second interleaving tables T1 and T2. The second interleaving tables T1 and T2 are similar to those that are used respectively for the interleaving operations in the single-band or multi-band communication modes, before the data are modulated by the modulators MOD1 13 and MOD2 15. The dimensions of the interleaving tables T1 and T2 are therefore defined respectively depending on the types of modulation implemented by the modulators MOD1 13 and MOD2 15. The types of modulation are for example BPSK, QPSK and 8PSK. Each column of a second interleaving table T1 and T2 corresponds to a subcarrier of the frequency band that is used, and each row corresponds to a symbol in the interleaving table. In the first interleaving table T used for a communication mode for communicating in an extended frequency band, the second interleaving tables T1 and T2 are concatenated such that the one that contains the lowest subcarriers is located on the left and the one that contains the highest subcarriers is located on the right, the first row of the first interleaving table T corresponding to the first rows of the second interleaving tables T1 and T2. When the data are interleaved in an interleaving mode specific to the communication mode for communicating in an extended frequency band, the interleaving is performed on the first interleaving table T comprising bits originating from the Viterbi encoder, and the distribution of the data per frequency band is carried out such that each of the second interleaving tables has its content addressed to just one of the modulators MOD1 13 and MOD2 15. More precisely, the data contained in the second interleaving table T1 are addressed to the modulator MOD1 13 and the data contained in the second interleaving table T2 are addressed to the modulator MOD2 15, after interleaving. Depending on the disparities in terms of the dimensions of the second interleaving tables T1 and T2, concatenating them as described above may lead to what are called "invalid" positions in the concatenated first interleaving table. The invalid positions are those contained in the first interleaving table T but not contained in one of the second interleaving tables T1 and T2. Any bits present at an invalid position after interleaving of the bits in the interleaving table T are moved to vacant positions in the second interleaving tables T1 and T2 before the bits are addressed to the modulators MOD1 13 and MOD2 15.

When the communication mode applied by the node device is single-band or multi-band outside an extended frequency band, the interleaving is conventionally performed by way of a second interleaving table T1 or T2, for each of the processing chains corresponding, respectively, to the modulator MOD1 13 and to the modulator MOD2 15.

Figure 4:
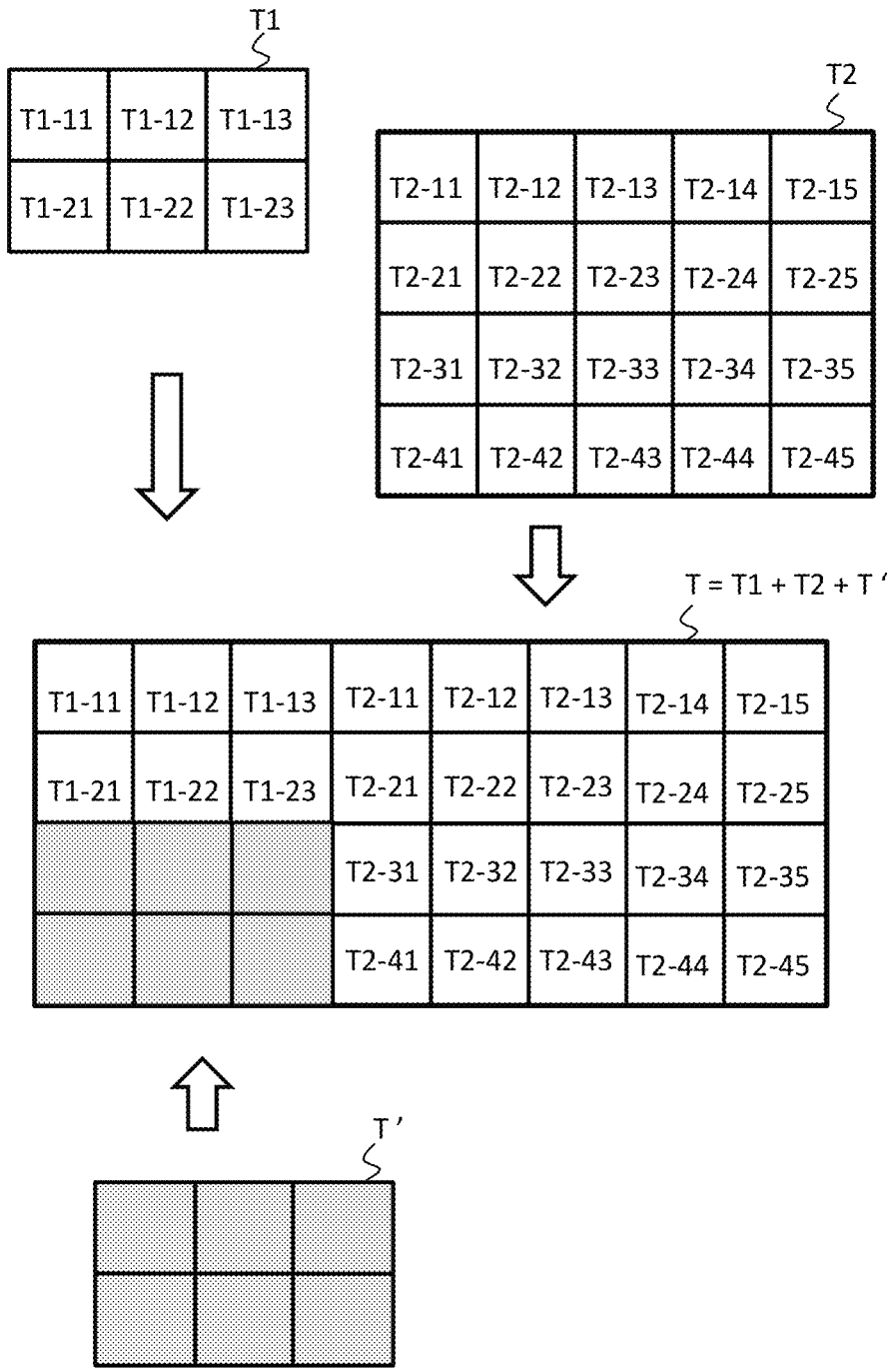
FIG. 4 illustrates an interleaving table T for performing data interleaving, in a communication mode for communicating in an extended frequency band, performed before data are transmitted by a node device, according to one embodiment.

FIG. 4 illustrates the concatenation of the second interleaving tables T1 and T2 that are used for interleaving the data when the communication mode applied by the node device is single-band or multi-band, into a first interleaving table T of dimensions larger than the dimensions of the second interleaving tables T1 and T2. If the respective dimensions of the second tables T1 and T2 are different, considering that the types of modulation used by the modulators MOD1 13 and MOD2 15 are different, then invalid positions occur, these being shown in the form of a fourth table T', such that T=T1+T2+T'.

Figure 5:
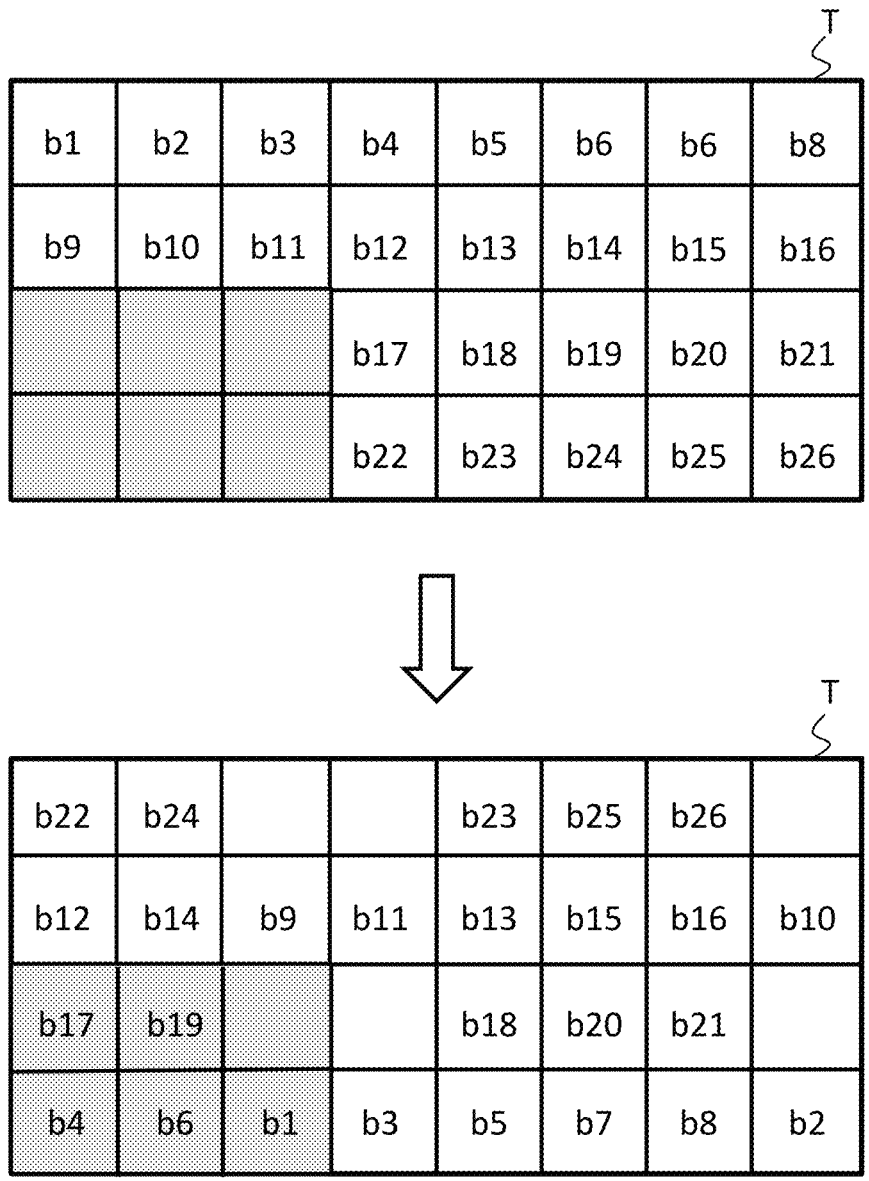
FIG. 5 illustrates an interleaving operation designed to perform data interleaving, in a communication mode for communicating in an extended frequency band, performed before data are transmitted by a node device, according to one embodiment.

FIG. 5 illustrates an interleaving operation performed in the table T, for a communication mode for communicating in an extended frequency band, through successive circular permutations of the rows and columns of the first interleaving table T.

Figure 6:
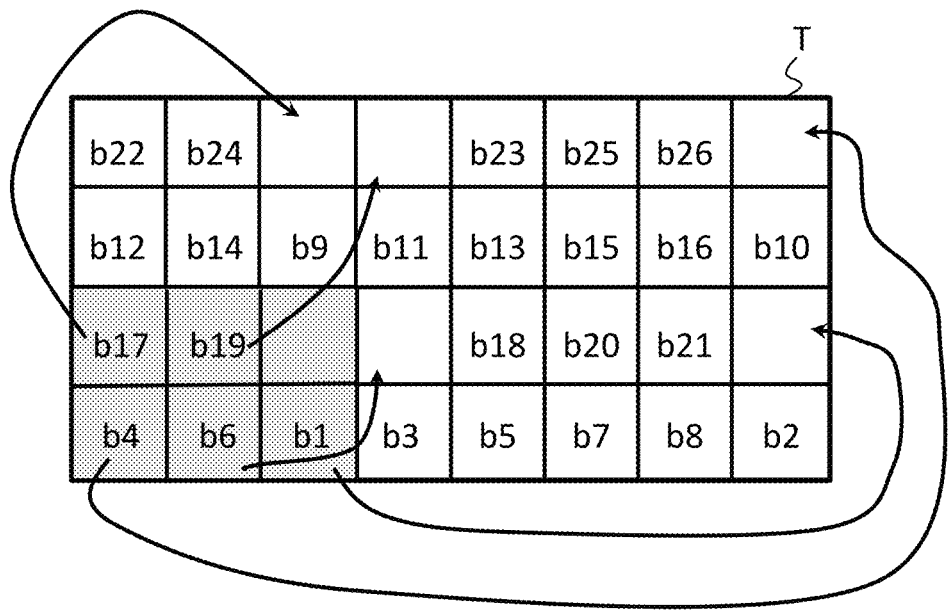
FIG. 6 illustrates processing of data in the data interleaving table T shown in FIG. 5 for finalizing data interleaving in a communication mode for communicating in an extended frequency band, performed before data are transmitted by a node device, according to one embodiment.

FIG. 6 illustrates a processing operation in the first interleaving table T aimed at moving any bits that are present in invalid positions in the first interleaving table T before directing the content of the second tables T1 and T2, respectively, to the modulators MOD1 13 and MOD 2 15.

Figure 7:
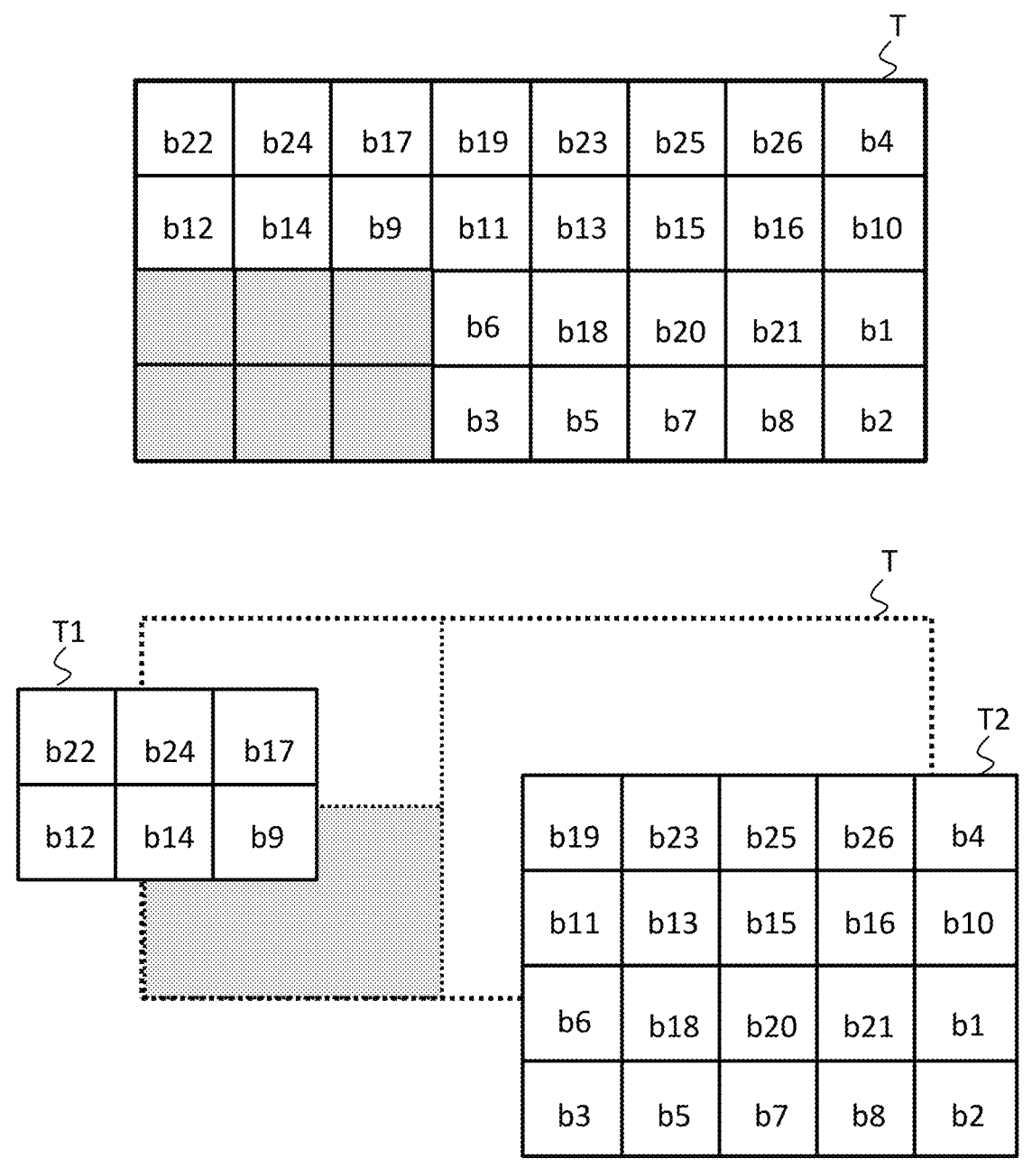

FIG. 7 illustrates a breakdown of the first interleaving table T into two groups of data corresponding to the two second interleaving tables T1 and T2 respectively associated with the modulators MOD1 13 and MOD2 15.

According to one embodiment, the second interleaving tables T1 and T2 are defined in accordance with the G3-PLC ITU-T G9903 recommendation.

Thus, according to the described example, the modulator MOD1 13 performs a BPSK modulation and the modulator MOD2 15 performs a QPSK modulation, such that the second interleaving table T1 comprises three columns and two rows and the second interleaving table T2 comprises five columns and four rows, since, in BPSK modulation, the separate frequency band comprises three subcarriers and, in QPSK modulation, the separate frequency band comprises five subcarriers.

Advantageously, the de-interleaving on the reception side is performed in the opposite manner to the interleaving. A node device operating in reception mode may thus define the frequency band on which transmission was performed.

For this purpose, a node device in reception mode may proceed in several ways. It may for example start by de-interleaving the data received on one or the other of the separate frequency bands, that is to say via one demodulator out of all of the demodulators that are used, and then on another of the separate frequency bands, and so on, depending on the number of demodulators that are used, and then process the received data if they appear to be coherent after de-interleaving. The node device may also for example start by de-interleaving the data in a de-interleaving mode specific to reception in an extended band. Several operating modes are thus conceivable.

In the following example, the node device firstly performs de-interleaving in an extended frequency band and checks the coherence of the data thus obtained therefrom. If the data are coherent when the de-interleaving is performed in the de-interleaving mode specific to the communication mode applied in an extended frequency band, that is to say using the first de-interleaving table T, the data were transmitted in the extended frequency band. Otherwise, if the data are not coherent, this means that they were transmitted by applying a single-band or multi-band communication mode or that communication in extended frequency mode is too noisy. It is then necessary to perform de-interleaving based on one or more second de-interleaving tables and to check the coherence of the data thereby obtained. If, in these new coherence tests, the data appear to be coherent, then data transmission in a single-band or multi-band communication mode is indeed involved, depending on whether the data are coherent from just one or from a plurality of demodulators. It may also be the case that, during transmission in multi-band mode, data from one of the demodulators are coherent and data from another demodulator are not coherent, because communication in the separate frequency band associated with the latter demodulator is too noisy.

Advantageously, it is possible to test the coherence of the data at reception based on bit error rate indicators at reception, which indicators are read from a Reed-Solomon decoding circuit and conventionally called BER (acronym for "Bit Error Rate").

Again advantageously, it is possible to test the coherence of the data by determining a checksum of CRC type applied to a control frame header of the MAC layer grouping together data at reception. The control frame is reconstructed by all of the circuits of the node device implementing the physical layer.

These mechanisms for determining the data transmission mode, which are applied by a node device that has transmitted data, are possible by virtue of the clever use of a first buffer memory in which the data at reception are arranged in a first de-interleaving table TD and second de-interleaving tables TD1 and TD2 before performing de-interleaving by proceeding in a manner strictly opposite (or symmetrical) to the interleaving operations described above.

The de-interleaving tables TD, TD1 and TD2 have dimensions that are respectively equal to the interleaving tables T, T1 and T2 already described in that the processing operations performed in order to de-interleave the data correspond to a processing operation strictly opposite to what is performed to interleave them.

Figure 3:
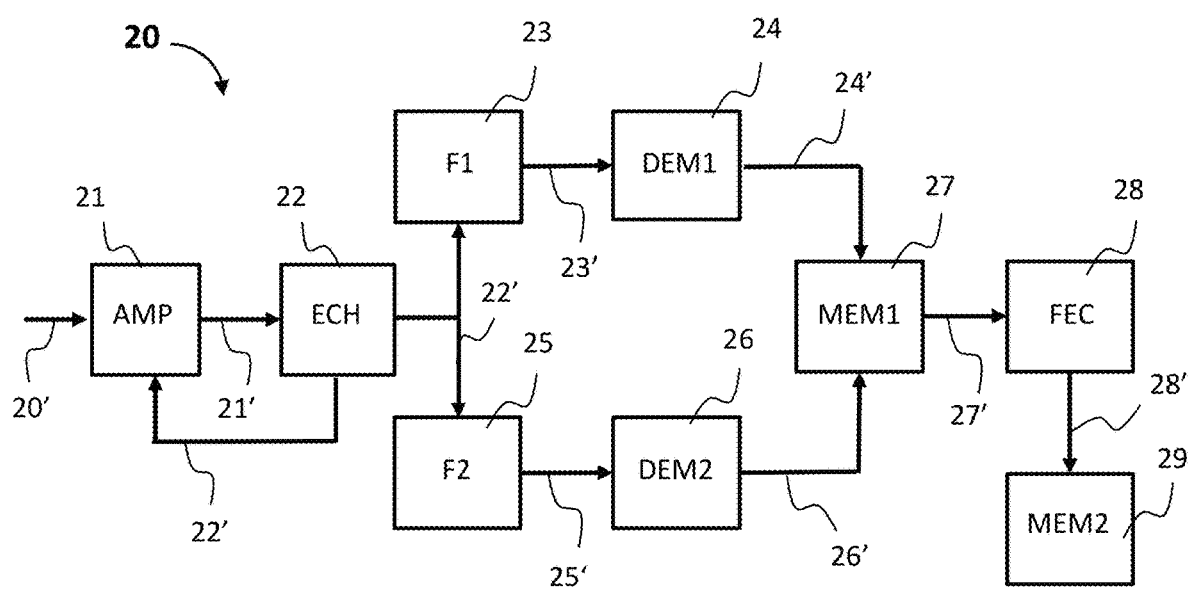
FIG. 3 illustrates a data reception chain in a node device of a power line communication network, according to one embodiment.

FIG. 3 illustrates a reception processing chain 20 of a node device, such as the node device 133 of the communication network 120, configured so as to operate in a power line communication network and configured so as to receive data in a single-band or multi-band communication mode or in extended frequency band mode. The reception processing chain 20 comprises two demodulators and may therefore process reception in single-band mode, in multi-band mode or in extended frequency band mode; the extended frequency band then comprising two separate frequency bands according to the described example. The processing chain 20 comprises an input 20' and a programmable gain stage AMP 21 configured so as to support any input dynamics of the multiple frequency bands and avoid any saturation of the signals of one of the separate frequency bands. For example, one possible setting mode is that of choosing the highest attenuation out of that required for the lowest band and that required for the highest band. An analogue-to-digital conversion stage ECH 22 performs the conversion and controls the gain, via a link 22' of the programmable gain stage AMP 21. The programmable gain stage AMP 21 is connected to the conversion stage ECH 22 via a link 21'. The conversion stage ECH 22 is pooled and the sampling frequency is defined with respect to the sampling frequency required in the separate frequency band having the highest frequency. Thus, if the frequency bands are those defined by the ITU-T G.9903 recommendation, the sampling frequency Fs of the conversion stage ECH 22 has to be greater than or equal to 1.2 MHz (according to table B.4 of the ITU-T G.9901 version 2017 recommendation).

According to one embodiment, the data transmitted in the various frequency bands, for which the node device that comprises the reception processing chain 20 is configured in reception mode, are then separated using digital filters F1 23 and F2 25. Since the frequency bands are separate, their respective signals are thereby easily able to be distinguished.

According to one example, the modulation corresponding to the "lower" separate band, for example CENELEC-A, uses frequencies between a minimum frequency Fbmin and a maximum frequency Fbmax. The digital filter F1 that is used is then a bandpass digital filter whose cutoff frequencies are Fbmin and Fbmax, or a low-pass digital filter whose cutoff frequency is Fbmax. The digital filter may thus be a Butterworth filter characterized by an order of 2, a band attenuation of 1 dB and a cutoff frequency at 120 kHz.

Still according to the usage example, the modulation corresponding to the "upper" separate band, for example the FCC frequency band, uses frequencies between a minimum frequency Fhmin and a maximum frequency Fhmax. The digital filter F2 that is used is then a bandpass digital filter whose cutoff frequencies are Fhmin and Fhmax, or a high-pass digital filter whose cutoff frequency is Fhmin. The digital filter may thus be a Butterworth filter characterized by an order of 2, a band attenuation of 1 dB and a cutoff frequency at 140 kHz. The digital filters F1 and F2 are preferably second-order filters. According to some variants, the filters have higher-order characteristics.

The data at the output of each of the digital filters F1 and F2 are then transmitted, respectively, to the demodulators DEM 1 24 and DEM2 26 via links 23' and 25'. Cleverly, the output from the demodulators DEM1 24 and DEM2 26 is processed by an FEC decoder 28 by way of a first memory MEM1 27, called de-interleaving memory. The data from the demodulators are loaded into the first de-interleaving memory MEM1 27 via links 24' and 26'. The data are loaded in a predefined layout so as to be able to de-interleave them in a plurality of de-interleaving modes. The layout corresponds to writing of the data to the de-interleaving tables TD, TD1 and TD2. A de-interleaving circuit of the FEC decoder 28 reads the data from the first de-interleaving memory MEM1 27 and is configured so as to check whether the de-interleaved data appear to be coherent. If the de-interleaved data appear to be coherent, they are recorded in a second memory MEM2 29, called reception memory of the MAC link sublayer, via a link 28'. The data thus stored in the reception memory MEM2 29 form data frames that are ready to be processed by the MAC layer of the ISO model. When data are available in the first de-interleaving memory MEM1 27, a first de-interleaving operation is performed by way of the first de-interleaving table TD. The coherence of the de-interleaved data in this de-interleaving mode specific to a transmission in an extended frequency band is then checked. If the data are not coherent, this means that another transmission mode was used to transmit the data, and a second de-interleaving operation, by way of each of the second de-interleaving tables TD1 and TD2, is performed.

In the example described above, the node device comprising the reception processing chain 20 comprises two demodulators DEM1 24 and DEM2 26. This architecture is not limiting, and a node device may for example comprise three or more demodulators, depending on the number of frequency bands in which it has to be able to receive data.

Figure 9:
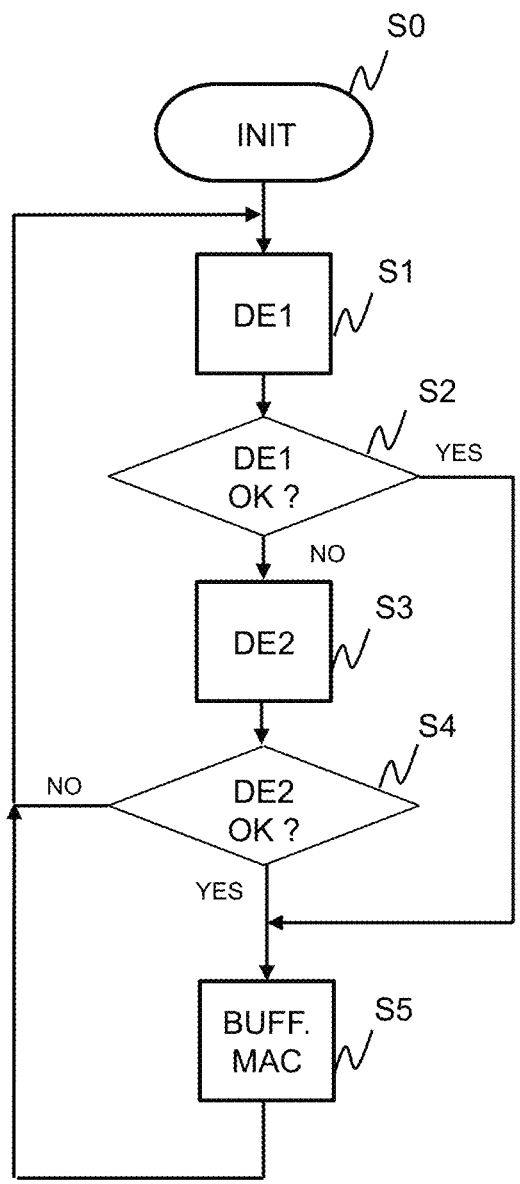
FIG. 9 is a flowchart showing steps of a method for the transmission of data in a node device, according to one embodiment.

The flowchart of FIG. 9 illustrates this method for reconstructing data frames in the MAC format according to one embodiment, for the node device 133 of the communication network 120. At the end of an initialization step S0, all of the configurations of the internal circuits of the node device 133, leading to the reception of data transmitted by a neighbouring node device, for example from the node device 134, have been performed. The amplification stage AMP 21 is thus programmed with an initial gain, the digital filters F1 23 and F2 25 are calibrated and the demodulators DEM1 24 and DEM2 26 are configured under the control of a control unit of the node device 133. According to the chosen example, the demodulator DEM1 24 is configured so as to perform a BPSK demodulation on data transmitted in the CENELEC-A frequency band and the demodulator DEM2 26 is configured so as to perform a QPSK demodulation on data transmitted in the FCC frequency band. The data received at the output of each of the demodulators DEM1 24 and DEM2 26 are loaded, respectively, into second de-interleaving tables TD1 and TD2, and therefore in fact into a first interleaving table TD comprising the second de-interleaving tables TD1 and TD2 and the dimensions of which, in terms of number of rows and columns, are therefore defined on the basis of the types of modulation (and therefore demodulation) that are used. The de-interleaving circuit of the FEC decoder 28 then performs de-interleaving in a first de-interleaving mode DE1 specific to data transmission in an extended frequency band in a step S1. The de-interleaved data are processed by the FEC decoder 28, and the coherence of the data is checked in a step S2. Thus, if the resulting reconstructed MAC data frame is coherent, that is to say if for example reading all of the fields of a control header of the data frame makes it possible to calculate a checksum CRC equal to the one read in the CRC field of the control header of the frame, then the data are considered to be coherent. According to one embodiment, in the opposite case, reading of a BER error rate indicator by the Reed-Solomon circuit of the FEC decoder 28 may make it possible to confirm that the quality of the data transmission is not sufficient to allow coherent data to be received. If the received data rendered in the MAC format appear to be coherent, they are recorded in a second buffer memory MEM2 29, called reception buffer of the MAC layer, in a step S5. If the data do not appear to be coherent in step S2, in which de-interleaving is performed in a first de-interleaving mode DE1, then de-interleaving is performed in a step S3 in a second de-interleaving mode DE2 by way of the second de-interleaving tables TD1 and TD2. De-interleaving in this second mode DE2 comprises de-interleaving the data loaded beforehand into the second de-interleaving table TD1 in parallel with de-interleaving the data loaded beforehand into the second de-interleaving table TD2. In a manner similar to the data coherence check performed in step S2, the coherence of the data thus de-interleaved in step S3 is checked in a step S4. The coherence of the data is checked firstly for the data de-interleaved by way of the second de-interleaving table TD1, and secondly for the data de-interleaved by way of the second de-interleaving table TD2. If the de-interleaved data originating from the two second de-interleaving tables TD1 and TD2 are coherent, then the data are transmitted in multi-band mode, since coherent data are received via the two demodulators DEM1 24 and DEM2 26 and the transmission is not performed in an extended frequency band. When the data de-interleaved in step S4 are coherent, they are recorded in the second buffer memory MEM2 29, called reception buffer of the MAC layer, in step S5 with a view to being processed by the MAC link sublayer of the OSI model.

If de-interleaved data appear to be coherent for de-interleaving performed by way of one of the second de-interleaving tables TD1 and TD2 but not for the other one, this means that the transmission is performed in single-band mode or else that one of the two frequency bands used for the transmission is very noisy. In this case too, indications from the BER error rate indicator of the FEC decoder 28 may make it possible to identify a problem with the quality of the reception link or the absence of any link established with a transmitter.

Figure 8:
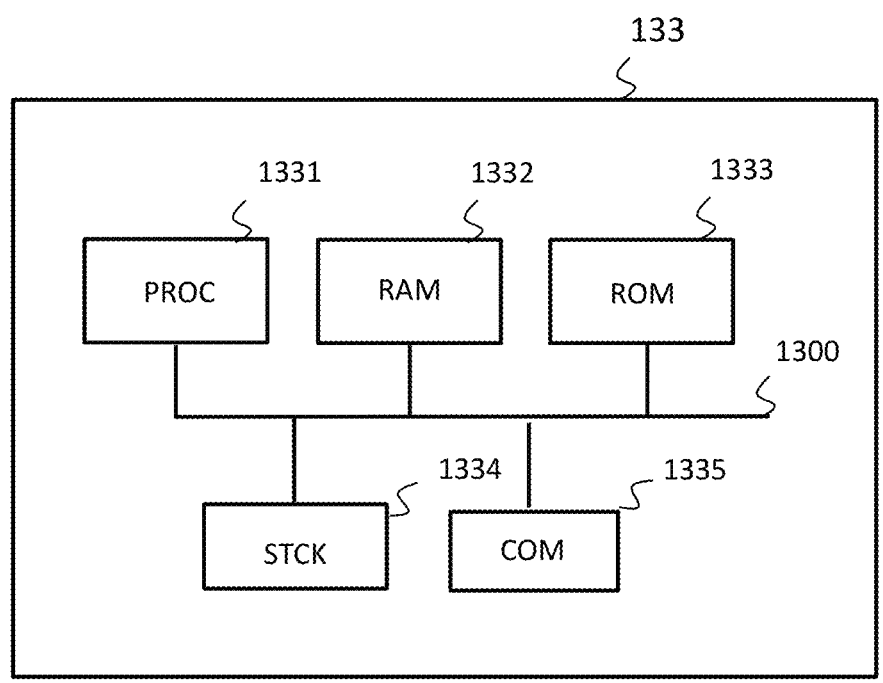
FIG. 8 schematically illustrates the internal architecture of a node device of the network of FIG. 1, according to one embodiment.

FIG. 8 schematically illustrates an exemplary internal architecture of any node device of the communication network 120. It will be considered by way of illustration that FIG. 8 illustrates an internal layout of the node device 133. Such a node device is said to be multi-band since it is capable of transmitting a message on a plurality of (transmission and reception) frequency bands. It will be noted that FIG. 8 could also schematically illustrate one example of a hardware architecture of a processing module contained in the first node device 133, such as interleaving or de-interleaving circuitry (also called interleaver or de-interleaver).

According to the exemplary hardware architecture shown in FIG. 8, the first node device 133 then comprises the following, connected by a communication bus 1300: a processor or CPU ("Central Processing Unit") 1331; a RAM ("Random Access Memory") 1332; a ROM ("Read Only Memory") 1333; a storage unit such as a hard disk (or a storage medium reader, such as an SD ("Secure Digital") card reader) 1334; at least one communication interface 1335 allowing the first node device 133 to communicate with the node devices belonging to its network neighbourhood, such as for example the node devices 134 and 137.

The processor 1301 is capable of executing instructions loaded into the RAM 1332 from the ROM 1333, from an external memory (not shown), from a storage medium (such as an SD card), or from a communication network. When the first node device 133 is turned on, the processor 1331 is capable of reading instructions from the RAM 1332 and executing them. These instructions form a computer program that causes the processor 1331 to implement all or part of the method described with reference to FIGS. 4 to 7 and 9.

All or part of the method described with reference to FIGS. 4 to 7 and 9 may be implemented in software form by executing a set of instructions using a programmable machine, for example a DSP ("Digital Signal Processor") or a microcontroller, or be implemented in hardware form by a machine or a dedicated component, for example an FPGA ("Field-Programmable Gate Array") or an ASIC ("Application-Specific Integrated Circuit"). In general, the node device 133 comprises electronic circuitry configured so as to implement the methods described with reference to the node device 133. Of course, the node device 133 furthermore comprises all of the elements that are usually present in a system comprising a control unit and its peripherals, such as a power supply circuit, a power supply supervision circuit, one or more clock circuits, a reset-to-zero circuit, input/output ports, interrupt inputs and bus drivers, this list not being exhaustive.

The invention claimed is:

1. A transmission method in a first node device of a power line communication network, the first node device being configured so as to apply a reception mode for receiving data transmitted by a second node device in one or more separate frequency bands in parallel, the method comprises steps of:
   converting the received data in the form of an analogue signal in one or more of said one or more separate frequency bands into a first series of data,
   filtering said first series of data in parallel through the same number of filtering circuits as the number of frequency bands in the one or more separate frequency bands, so as to obtain the same number of second series of data as there are frequency bands for which the first node device is configured in reception mode,
   demodulating said second series of data through the same number of demodulation circuits as there are frequency bands for which the first node device is configured in reception mode, so as to obtain third series of data,
   recording the third series of data in a first buffer memory, and
   de-interleaving data from said first buffer memory to get de-interleaved data, for each of the one or more separate frequency bands, in a de-interleaving mode specific to one of the one or more the separate frequency bands for which the de-interleaving is performed, detecting whether the de-interleaved data are coherent and, if the de-interleaved data are coherent, supplying the de-interleaved data with a view to subsequent processing.

2. The transmission method according to claim 1, wherein the first node device is furthermore configured so as to apply a reception mode for receiving data transmitted by a second node device in a frequency band called "extended frequency band" comprising at least two separate frequency bands from among said separate frequency bands, reception in said extended frequency band taking place in parallel in the at least two separate frequency bands, the method furthermore comprising steps of de-interleaving the data read from said first buffer memory in a de-interleaving mode specific to reception in the extended frequency band, detecting whether the de-interleaved data de-interleaved in said de-interleaving mode specific to said extended frequency band are coherent and, if said data de-interleaved in a de-interleaving mode specific to said extended frequency band are coherent, supplying said de-interleaved data de-interleaved in said de-interleaving mode specific to said extended frequency band with a view to subsequent processing.

3. The transmission method according to claim 1, wherein the step of detecting whether the data are coherent comprises checking control bits by way of a direct error correction circuit called "FEC decoder".

4. The transmission method according to claim 1, wherein the step of detecting whether the data are coherent comprises reading a data frame control header and determining a checksum of CRC type.

5. The transmission method according to claim 1, wherein the subsequent processing is a read operation on a MAC layer data frame formatted in accordance with the ITU-T G9903 recommendation.

6. A method according to claim 1, wherein the filtering circuits comprise preferably second-order filters that separate data respectively transmitted in separate frequency bands from among the following group: CENELEC A frequency band, CENELEC B frequency band, and FCC frequency band or ARIB frequency band.

7. A node device called "first node device" in a power line communication network, the first node device being configured so as to communicate in one or more separate frequency bands with a second node device (134) of said network, the first node device is furthermore configured so as to apply a reception mode for receiving data in one or more of said one or more separate frequency bands in parallel, and in that the first node device comprises electronic circuits configured so as to:
   convert the data received in the form of an analogue signal in one or more of said one or more separate frequency bands into a first series of data,
   filter said first series of data in parallel through the same number of filtering circuits as there are frequency bands for which the first node device is configured in reception mode, so as to obtain the same number of second series of data as there are frequency bands for which the first node device is configured in reception mode,
   demodulate said second series of data through the same number of demodulation circuits as there are frequency bands for which the first node device is configured in reception mode, so as to obtain third series of data,
   record the third series of data in a first buffer memory, and
   de-interleave data from said first buffer memory to get de-interleaved data, for each of the separate frequency bands, in a de-interleaving mode specific to one of the one or more separate frequency bands for which the de-interleaving is performed and, if the de-interleaved data are coherent, supply the de-interleaved data with a view to subsequent processing.

8. The node device according to claim 7, configured so as to apply a reception mode for receiving data in a frequency band called "extended frequency band" comprising at least two separate frequency bands from among said separate frequency bands, reception in said extended frequency band taking place in parallel in the at least two separate frequency bands, furthermore comprising electronic circuits configured so as to:
   de-interleave data read from said first buffer memory in a de-interleaving mode specific to reception in the extended frequency band and detect whether the de-interleaved data de-interleaved in said de-interleaving mode specific to said extended frequency band are coherent and,
   if said data de-interleaved in said de-interleaving mode specific to the extended frequency band are coherent, supply said de-interleaved data de-interleaved in said de-interleaving mode specific to said extended frequency band with a view to subsequent processing.

9. A power line communication network comprising a plurality of node devices according to claim 7.

10. A non-transitory storage medium comprising program code instructions for executing the method according to claim 1 when said program is executed by a processor.

* * * * *